3,012,971
WHITENING COMPOSITION FOR PAPER

Joseph Gessner, Woodstown, N.J., and Ralph Crawford Seyler, Wilmington, Del., assignors to E. I. du Pont de Nemours and Company, Wilmington, Del., a corporation of Delaware
No Drawing. Filed Apr. 7, 1959, Ser. No. 804,597
6 Claims. (Cl. 252—301.2)

This invention relates to an improved whitening composition for use in whitening paper. It is an object of this invention to provide a composition of matter for the aforementioned purpose which is in the form of a concentrated aqueous solution, adapted to be diluted to the desired concentration of the treatment bath with minimum mechanical effort, and which will exert a whitening effect on the paper equal to the best effects obtainable hitherto from the same whitening agents in other physical forms or modes of application. Various additional objects and achievements of this invention will become apparent as the description proceeds.

The use of fluorescent agents for whitening paper is per se well known. A class of agents commonly used for this purpose are diaminostilbene derivatives, and one member of this family which has acquired particular commercial importance is a compound of the formula

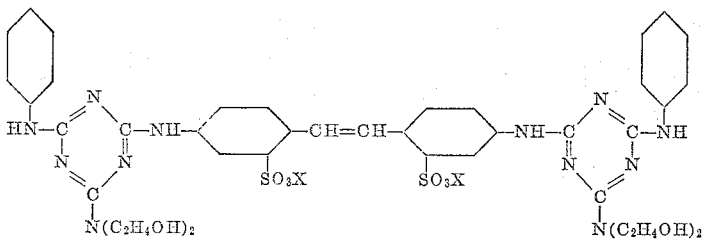

wherein X is H, Na or K. This compound may be named 4,4′-bis-[2 - phenylamino - 4-diethanolamino-1,3,5-triazyl(6)]-diaminostilbene-2,2′-disulfonic acid, or an alkali-metal salt thereof. The preparation of this agent and other related compounds is described in U.S. Alien Property Custodian specification Serial No. 381,856, published May 11, 1943.

It has been observed, however, that for obtaining good whitening effects on paper, borax or tetrasodium pyrophosphate must be used in conjunction with the above fluorescent. Thus, good results may be obtained by dipping paper in sheet form into an aqueous "dye bath," formed by dissolving in water certain dry compositions containing the said fluorescent and tetrasodium pyrophosphate in powder form, then squeezing out or draining excess moisture and drying the sheets. However, this procedure has practical disadvantages when applied on a plant scale, largely due to the difficulty of dissolving the powder in the treating bath and because of the tendency to spread dusts in the surrounding atmosphere.

We now find that concentrated solutions of the whitening agent above formulated, characterized by good stability in storage, easy dilutability with water and remarkably potent whitening effects of the resulting dye bath when applied to paper sheets, are obtained by adding to the whitening agent of the aforegoing formula an alkylolamine of the general formula $(HO\text{-}alk)_x\text{-}NR_{(3-x)}$ wherein alk is an alkylene radical of 2 to 4 C-atoms, R is hydrogen or an alkyl radical of 1 to 8 C-atoms, while x is an integer from 1 to 3. Typical, commercially available illustrations of alkylolamines which come under the above definition are: monoethanolamine, diethanolamine, tri-ethanolamine; the corresponding mono-, di- or tripropanolamines (normal or iso); the corresponding butanolamines (normal, iso or tert.; mono, di or tri); N-methyl diethanolamine; N,N-dimethyl ethanolamine, N,N-diethyl ethanolamine, N,N-diisopropyl ethanolamine, and N,N-di(2-ethylhexyl) ethanolamine.

The proportion by weight of the alkylolamine agents to whitening agent may vary widely, say from 0.5:1 to 3.0:1 and is preferably determined experimentally, the minimum practical quantity of the alkylolamine being that which will effect complete solution in water (as far as judged by the naked eye) of the desired quantity of whitening agent, to give a marketable concentrated aqueous solution of the same.

More particularly, the concentrated whitening agent solutions of this invention will generally contain from 35% to 10% by weight of the said whitening agent, from 5% to 35% by weight of said alkylolamine, an inevitable residual quantity of sodium chloride which is inherent in the synthesis and recovery of the whitening agent, the remainder of the solution being water. For best results, however, the bulk of the salt content of the whitening agent is removed before preparation of the solution, and care is taken that the residual quantity shall not exceed 1% by weight of the concentrated solution. The water content of the concentrate will accordingly vary from about 30% to about 85% by weight.

The liquid concentrate described above is a clear light yellow or amber solution which is stable to storage over the range of temperatures normally encountered; i.e., warehouse temperatures in summer and winter. Sometimes a slight separation of components may occur at winter temperatures, but on warming to room temperature for use, complete solution is again obtained.

This solution can be readily diluted at room temperature. For practical use, it is diluted to give an ultimate whitening agent concentration of about 0.05% to 0.10%. Paper in the form of sheets may then be immersed in the dye bath, freed of excess water, and dried.

The unforeseen effect of the mentioned alkylolamines on the potency of the solution as a whitening agent is particularly remarkable when it is considered that other known solutions of the same whitening agents (e.g. Cellosolve solutions) give a relatively poor whitening effect when applied to paper sheets by the above procedure. On the other hand, Cellosolve (lower alkyl ethers of ethylene glycol) or other alcoholic agents may be added, without ill effect, to our novel concentrated solution, in optional proportions, so long as the alkylolamine : fluorescent ratio stays within the limits above noted, i.e. from 0.5:1 to 3.0:1. Ratios larger than 3.0:1 may be used, but simply add to the cost of the solution.

Without limiting this invention, the following examples are given to illustrate our preferred mode of operation. Parts mentioned are by weight.

Example 1

76.2 parts of a press cake containing 25 parts of 4,4′-bis-[2 - phenylamino-4-diethanolamino-1,3,5-triazyl(6)]-diaminostilbene disulfonic acid and 1.2% NaCl is mixed at room temperature with 37.8 parts of triethanolamine and 7.2 parts of water. The resulting solution is filtered with the aid of Filter-Cel and contains by analysis approximately 21% by weight of the dye, 31% by weight of triethanolamine and 0.68% sodium chloride. (This corresponds to an alkanolamine:whitening agent ratio of 9.1:1 in moles.) The solution does not cloud even at temperatures as low as 0° C.

When the above solution is diluted with water at room temperature to a concentration of 0.05% by weight of the whitening agent, and paper sheeting, for instance sized white cover board, is dipped into the solution, squeezed and dried at 180° F., the paper is found to be very white and bright and acceptable for commercial use.

When the same paper is treated at the same strength in a similar fashion with the same whitening agent, but in a Cellosolve solution, no alkylolamine being present, the treated paper is dull and has a yellowish cast.

*Example 2*

A mixture of 417 parts of the crude whitening agent in the form of its sodium salt (containing 165 parts of the active ingredient), 316 parts of triethanolamine and 267 parts of water are mixed at 60° C. for 2.5 hours, and after cooling to 15° to 20° C., the mass is filtered with aid of super-cell. The resulting solution contains 16.5% by weight of whitening agent, 31.7% of triethanolamine and 1.0% salt.

When this solution is diluted to a concentration of 0.1% by weight of the whitening agent and paper is treated therewith as in Example 1, the resulting paper possesses a commercially acceptable quality of whiteness and brightness.

*Example 3*

A solution is prepared as in the above examples to contain 35% by weight of monoethanolamine, 12% of the whitening agent in the form of the free acid and 0.18% salt. The solution is stable to storage, and on evaluation on paper at a concentration of 0.1% dye, gives satisfactory whitening effects.

Essentially the same results are obtained if the monoethanolamine in this example is replaced by an equal weight of mono-, di- or tripropanolamine, normal or iso.

The alkanolamine:whitening agent mole ratio in this example calculates to 44:1 when monoethanolamine is used and to 14:1 when the same weight of tripropanolamine is employed.

*Example 4*

A solution comprising 24% by weight of diethanolamine and 18.8% of the whitening agent was diluted to a concentration of 0.05% of the whitening agent and evaluated on paper as in Example 1. It was found satisfactory.

Essentially the same results are obtained if the diethanolamine in this example is replaced by an equal weight of N-methyl diethanolamine or di(2-ethylhexyl)-ethanolamine.

*Example 5*

A solution comprising 35% by weight of whitening agent and 35% of triethanolamine (which corresponds to an alkanolamine:dye ratio of 6.55:1 in moles) was evaluated on sized, white cover board at a concentration of 0.1% whitening agent in the dye bath. The resulting paper was found to be of satisfactory whiteness and fully equivalent to a commercial paper obtained by the beater technique using a dry formulation of whitening agent of the following composition:

| | Parts |
|---|---|
| The fluorescent above formulated (Na salt) | 12 |
| Sugar | 85 |
| Soda ash | 3 |
| Total | 100 |

The said beater technique, more over, required a beater concentration of the above composition equivalent to 0.25% by weight of the active ingredient.

*Example 6*

A mixture of 13.5 parts of triethanolamine, 25 parts of the whitening agent (76.2 parts of press cake containing 25 parts of agent and 1.2% NaCl) and water to make 200 parts total is heated at 70° to 75° C. until solution is complete. This solution thus contains 6.75% triethanolamine and 12.5% of the whitening agent, which corresponds to a mole ratio of about 3.3:1, in the order named. This solution is stable to storage and, when it is diluted with water to a dye concentration of 0.1%, it gives satisfactory whitening effects on paper.

It will be understood that the details of this invention may be varied widely without departing from the spirit thereof.

This application is a continuation-in-part of our application Serial No. 672,107, now abandoned, filed July 16, 1957.

We claim as our invention:

1. A composition of matter for whitening paper, consisting essentially of a concentrated aqueous solution of a whitening agent and an alkylolamine and being adapted to be diluted with water to give an aqueous treatment bath, said composition being the product of mixing together water, a whitening agent of the formula

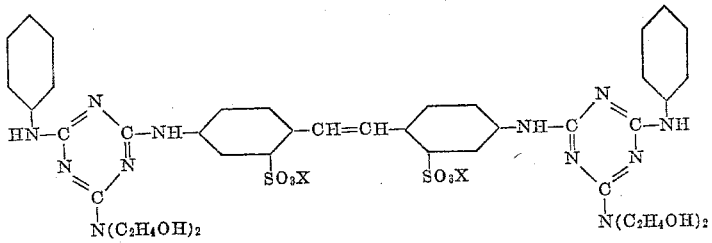

wherein X stands for a member of the group consisting of hydrogen and the alkali metals, and an alkylolamine of the formula $(HO\text{-}alk)_x\text{-}NR_{(3-x)}$, wherein alk is an alkylene radical of 2 to 4 C-atoms, R is a member of the group consisting of hydrogen and alkyl radicals of 1 to 8 C-atoms, while x is an integer from 1 to 3, said whitening agent being present in quantity from 35% to 10% by weight of the entire mixture, said alkylolamine being present in quantity sufficient to effect dissolution of said whitening agent in the aqueous mixture but not less than 3.3 moles per mole of said whitening agent, and said composition being free of sodium chloride except in a quantity not exceeding 1% by weight of the entire mixture.

2. A composition of matter as in claim 1, the quantity of said alkylolamine being from 5% to 35% by weight of the entire mixture.

3. A composition of matter as in claim 1, said alkylolamine being an ethanolamine.

4. A composition of matter for whitening paper in sheet form and being an aqueous concentrate resulting from mixing of water, monoethanolamine and a whitening agent of the formula set forth in claim 1, said whitening agent being present in quantity from 35% to 10% by weight of the entire mixture while the monoethanolamine is present in quantity sufficient to effect dissolution of said whitening agent in the aqueous mixture but not less than 3.3 moles per mole of said whitening agent, said concentrated composition having the appearance of a clear, light yellow to amber solution which is stable in storage at room temperature and being adapted to be diluted with water to give an aqueous treatment bath for said paper sheets.

5. A composition of matter for whitening paper in sheet form and being an aqueous concentrate resulting from mixing of water, a concentrated aqueous solution diethanolamine and a whitening agent of the formula set forth in claim 1, said whitening agent being present in quantity from 35% to 10% by weight of the entire mixture while the diethanolamine is present in quantity sufficient to effect dissolution of said whitening agent in the aqueous mixture but not less than 3.3 moles per mole of said whitening agent, said concentrated composition having the appearance of a clear, light yellow to amber solution which is stable in storage at room temperature and being adapted to be diluted with water to give an aqueous treatment bath for said paper sheets.

6. A composition of matter for whitening paper in sheet form and being an aqueous concentrate resulting from mixing of water triethanolamine and a whitening agent of the formula set forth in claim 1, said whitening agent being present in quantity from 35% to 10% by weight of the entire mixture while the triethanolamine is present in quantity sufficient to effect dissolution of said whitening agent in the aqueous mixture but not less than 3.3 moles per mole of said whitening agent, said concentrated composition having the appearance of a clear, light yellow to amber solution which is stable in storage at room temperature and being adapted to be diluted with water to give an aqueous treatment bath for said paper sheets.

References Cited in the file of this patent

UNITED STATES PATENTS

| | | |
|---|---|---|
| 2,878,248 | Crounse | Mar. 17, 1959 |

FOREIGN PATENTS

| | | |
|---|---|---|
| 647,718 | Great Britain | Dec. 20, 1950 |
| 128,651 | Australia | Mar. 16, 1945 |

OTHER REFERENCES

Ser. No. 381,856, Wendt (A.P.C.), published May 11, 1943.

UNITED STATES PATENT OFFICE
CERTIFICATION OF CORRECTION

Patent No. 3,012,971                 December 12, 1961

Joseph Gessner et al.

It is hereby certified that error appears in the above numbered patent requiring correction and that the said Letters Patent should read as corrected below.

Column 5, line 8, strike out "a concentrated aqueous solution"; line 22, after "water" insert a comma.

Signed and sealed this 17th day of April 1962.

(SEAL)
Attest:

ESTON G. JOHNSON
Attesting Officer

DAVID L. LADD
Commissioner of Patents